(12) United States Patent
Greer et al.

(10) Patent No.: US 7,280,937 B1
(45) Date of Patent: Oct. 9, 2007

(54) SYSTEM AND METHOD FOR DETECTING AN AXIAL POSITION OF A SHAFT

(75) Inventors: Ashley Elwood Greer, Moline, IL (US); James Edward Lenz, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/406,121

(22) Filed: Apr. 18, 2006

(51) Int. Cl.
*G01B 7/30* (2006.01)

(52) U.S. Cl. .............. 702/151; 702/150; 324/207.11; 324/207.15; 324/207.25

(58) Field of Classification Search ................ 702/151
See application file for complete search history.

(56) References Cited

U.S. PATENT DOCUMENTS

| | | | | |
|---|---|---|---|---|
| 3,956,973 | A | 5/1976 | Pomplas | 92/5 R |
| 6,147,342 | A | 11/2000 | Kucher | 250/231.13 |
| 6,253,460 | B1 | 7/2001 | Schmitz | 33/706 |
| 6,288,533 | B1 * | 9/2001 | Haeberli et al. | 324/207.2 |
| 6,433,536 | B1 * | 8/2002 | Yundt et al. | 324/207.22 |
| 6,834,574 | B2 | 12/2004 | Neumann | 91/1 |
| 6,989,669 | B2 | 1/2006 | Low et al. | 324/207.25 |
| 2002/0171417 | A1 * | 11/2002 | Schodlbauer | 324/207.21 |
| 2003/0197504 | A1 * | 10/2003 | Gray et al. | 324/207.24 |
| 2004/0222788 | A1 | 11/2004 | Low et al. | |

FOREIGN PATENT DOCUMENTS

| | | |
|---|---|---|
| EP | 1357365 | 10/2003 |
| JP | 2038802 | 2/1990 |
| JP | 2138508 | 5/1990 |
| JP | 3152403 | 6/1991 |
| JP | 3265704 | 11/1991 |

OTHER PUBLICATIONS

Honeywell 2SS52M Omnipolar Magnetroresistive Sensor with PC Board Terminals. Data Sheet [online]. Honeywell International, Inc. [retrieved in Mar. 2006]. Retrieved from the Internet: <URL http://catalog.sensing.honeywell.com/datasheet.asp?FAM=solidstate&PN=2SS52M>, 2 pages.
European Search Report dated Aug. 1, 2007.

* cited by examiner

*Primary Examiner*—Hal Wachsman

(57) ABSTRACT

A shaft comprises a hardened outer metallic layer having a first hardness level with a generally uniform radial depth. A first strip extends in a generally longitudinal direction in the outer metallic layer. The first strip has a second hardness level different from the first hardness level. A second strip in the outer metallic layer has the second hardness level. The first strip and the second strip are spaced apart from each other over at least a longitudinal region. A sensor senses an angular difference between a first magnetic field associated with the first strip and a second magnetic field associated with the second strip. A data processor references an established relationship between a position of the shaft and the angular difference between magnetic fields associated with the first strip and the second strip to detect a position of the shaft with respect to a reference point.

17 Claims, 4 Drawing Sheets

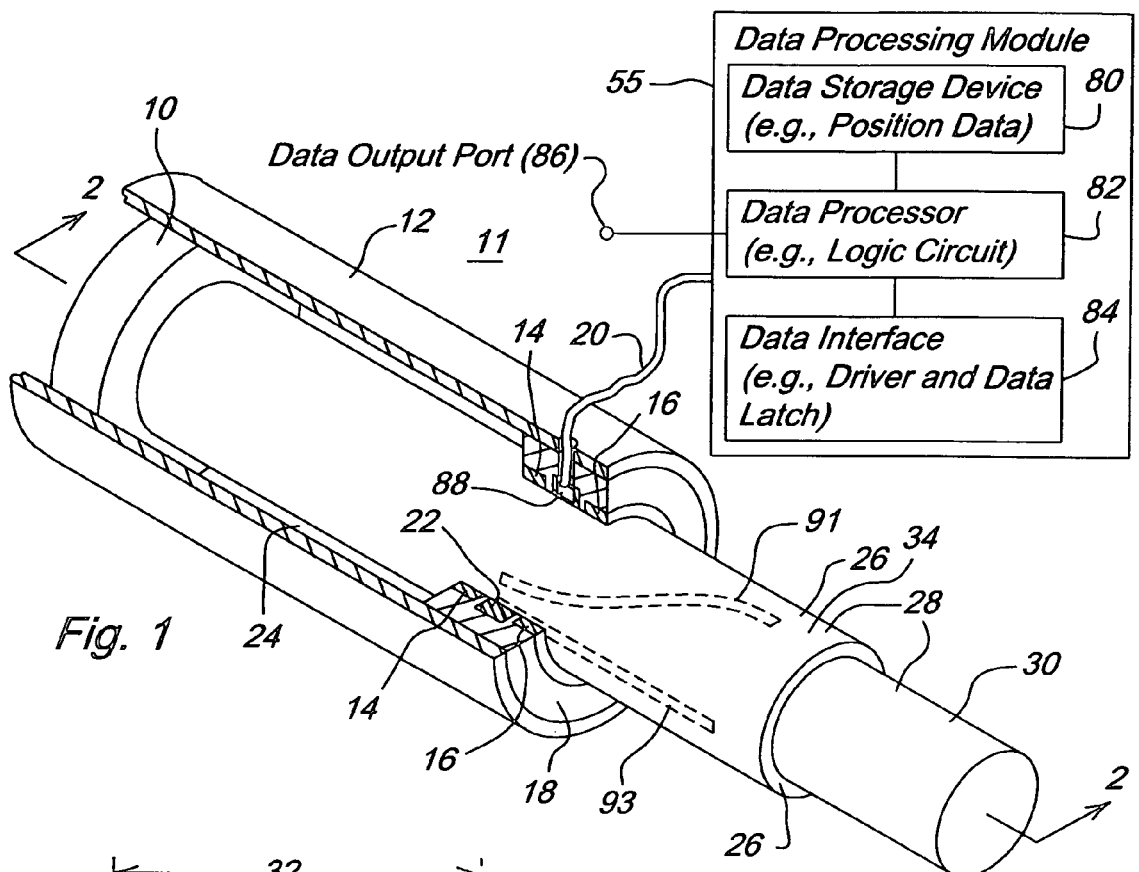
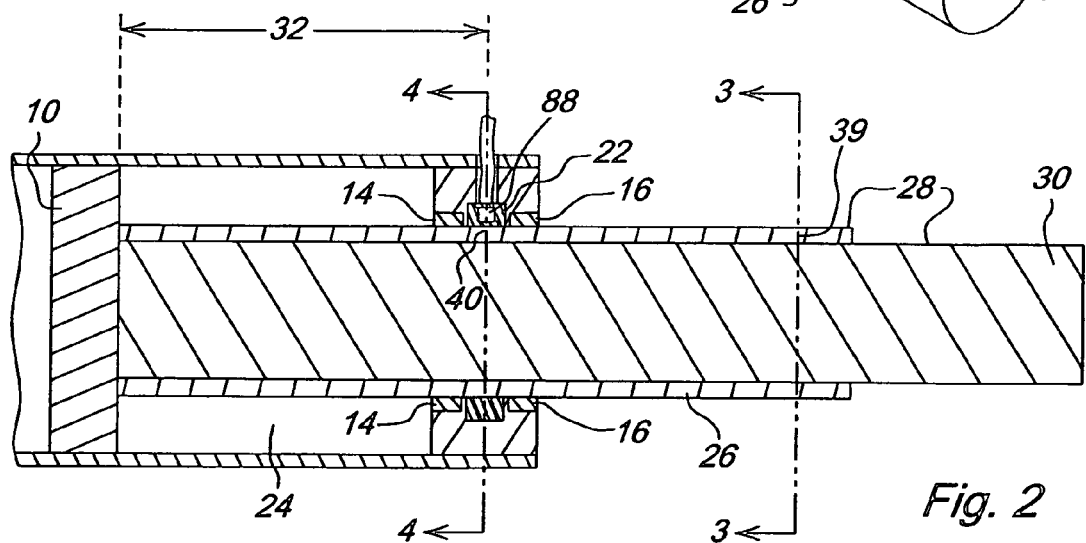
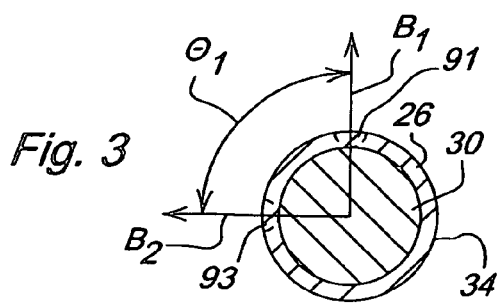
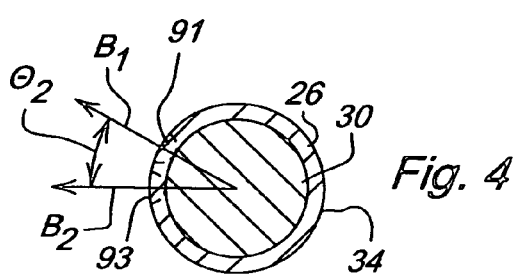

US 7,280,937 B1

SYSTEM AND METHOD FOR DETECTING AN AXIAL POSITION OF A SHAFT

FIELD OF THE INVENTION

This invention relates to a method and system for detecting an axial position of a shaft.

BACKGROUND OF THE INVENTION

In the prior art, cylinder position sensing devices may use a magnet embedded in a piston and one or more Hall effect sensors that sense the magnetic field; hence, relative displacement of the piston. However, in practice such cylinder position sensors are restricted to cylinders with limited stroke and may require expensive magnets with strong magnetic properties. Other prior art cylinder position sensing devices may use magnetostrictive sensors which require multiple magnets to be mounted in the cylinder. To the extent that machining and other labor is required to prepare for mounting of the magnets, the prior art cylinder position sensing may be too costly and impractical for incorporation into certain shafts. Thus, a need exists for a reliable and economical technique for determining the position of a shaft.

SUMMARY OF THE INVENTION

In accordance with one embodiment of the invention, a shaft comprises a hardened outer metallic layer having a first hardness level with a generally uniform radial depth. A first strip extends in a generally longitudinal direction in the outer metallic layer. The first strip has a second hardness level different from the first hardness level. A second strip in the outer metallic layer has the second hardness level. The first strip and the second strip are spaced apart from each other over at least a longitudinal region. A sensor assembly senses an angular difference between a first magnetic field associated with the first strip and a second magnetic field associated with the second strip. A data processor references an established relationship between an axial position of the shaft and the sensed angular difference between magnetic fields associated with the first strip and the second strip to detect the axial position of the shaft with respect to a reference point.

BRIEF DESCRIPTION OF THE DRAWINGS

FIG. 1 is a perspective view of one embodiment of a system for detecting the axial position of a shaft in accordance with the invention.

FIG. 2 is a cross-sectional view of the system of FIG. 1.

FIG. 3 shows a cross-sectional view of the shaft along reference line 3-3 of FIG. 2.

FIG. 4 shows a cross-sectional view of the shaft along reference line 4-4 of FIG. 2.

Like reference numbers in different drawings indicate like elements.

DESCRIPTION OF THE PREFERRED EMBODIMENT

Figure 5:
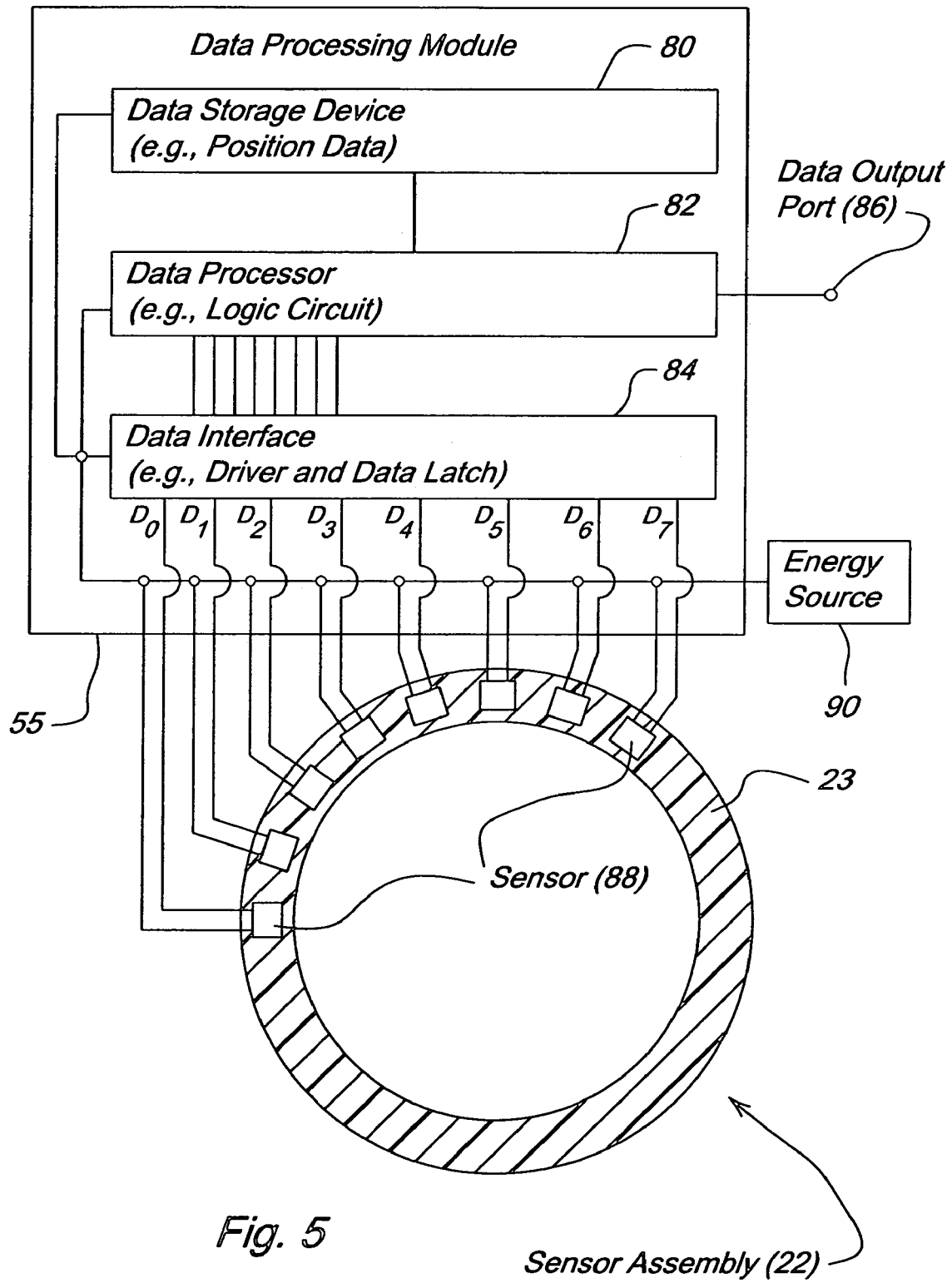
FIG. 5 shows a cross-sectional view of a sensor assembly and a schematic of the data processing module of FIG. 1.

In accordance with one embodiment, FIG. 1 shows a perspective view of a system for detecting an axial position of a shaft 28 (or a member 10 attached thereto) with respect to a cylinder 12 (e.g., hydraulic cylinder). The cylinder 12 is cut away to better reveal the components of FIG. 1. A member 10, such as a piston, may be coupled to one end of the shaft 28. The member 10 is slidable in an axial direction within the cylinder 12. The volume bounded by the member 10 and the interior of the cylinder 12 is referred to as the chamber 24. If the member 10 and shaft 28 are part of a hydraulic cylinder or assembly, the chamber 24 would contain hydraulic fluid or oil, for example.

A bushing 18 is associated with the cylinder 12. For example, a bushing 18 is secured (e.g., press-fitted or threaded into the interior of the cylinder 12) between the cylinder 12 and the shaft 28. The bushing 18 houses one or more seals (e.g., inner seal 14 and outer seal 16) and a sensor assembly 22. The bushing 18 or the cylinder 12 may support the mounting of an inner seal 14 and an outer seal 16, for instance, In one embodiment, the seals (14, 16) are lubricated to reduce friction at the shaft-busing interface. The bushing 18 may function as a shaft guide for the shaft 28. The bushing 18 supports longitudinal movement of the shaft 28 with respect to the cylinder 12.

Although a sensor assembly 22 may be housed in the bushing 18 as shown in FIG. 1, in other embodiments the sensor assembly 22 may be mounted elsewhere in or on the cylinder 12. As shown, the sensor assembly 22 may comprise a ring or annular member that is placed around the shaft 28 and spaced apart from the shaft 28. In an alternate embodiment, the sensor assembly 22 comprises a ring that is integrated into the inner seal 14 or outer seal 16.

The sensor assembly 22 facilitates sensing of the axial position of the shaft 28 with respect to the cylinder 12. The sensor assembly 22 may comprise one or sensors 88 that sense magnetic fields associated with a first strip and a second strip in the shaft 28. In one embodiment, each sensor 88 comprises one or more of the following: a magnetoresistive sensor, a Hall-effect sensor, a digital position sensor, and another position sensor.

In one embodiment, the magnetoresistive sensor may be operated in a saturated mode to measure or map the angle of magnetic field lines, for example. A magnetoresistive sensor may comprise a semiconductor that changes resistance based on the magnetic field vector (e.g., magnetic field strength and its direction) that is received by the magnetoresistive sensor. The saturation mode may be attained by positioning one or more biasing magnets (e.g., rare earth magnets or electromagnets) around the sensor assembly 22. The biasing magnets may be positioned to reinforce the magnetic fields of dipoles produced by the first strip 91, the second strip 93, or both, for instance. Advantageously, the sensor assembly 22 is not located with the pressurized chamber of the cylinder 12 and does not need to withstand any thermal stress or pressure associated with the chamber 24.

The sensor assembly 22 or sensors 88 are coupled to a data processing module 55. For example, the sensor assembly 22 may be coupled to a data interface 84 of the data processing module 55. The data processing module 55 comprises a data interface 84 which is in communication with a data processor 82. In turn, the data processor 82 is capable of communicating with a data storage device 80. The data processor 82 comprises a logic circuit, a microprocessor, a microcontroller, programmable logic device, a digital signal processor, or another data processing device. The data storage device 80 may comprise memory (e.g., nonvolatile memory, electronically erasable programmable read-only memory) or the like. The data interface 84 may comprise a driver to convert a ground closure, a semiconductor switch closure, a change in resistance, or sink of one or more sensors 88 to a logic level input (e.g., or voltage range) suitable for the data processor 82. Further, the data interface 84 may comprise a latch, a flip-flop, or buffer memory for storing or buffering input data from the data interface 84.

The data processor 82 determines axial or longitudinal position of the shaft 28 with respect to a cylinder 12 (at a respective time) based on the sensed electromagnetic field or magnetic field detected by the sensor assembly 22. The sensor assembly 22 supports detection of a first magnetic field of first magnetic dipole associated with the first strip 91 and a second magnetic field or second magnetic dipole associated with the second strip 93. The first magnetic field or first magnetic dipole indicates a first angle of the first strip 91 on the shaft 28, whereas the second magnetic field or second magnetic dipole indicates a second angle of the second strip 93 on the shaft 28. For the first strip 91 and the second strip 93, the angular difference or separation between the first angle and the second angle varies with the axial displacement or along the longitudinal axis of the shaft 28. The data storage device 80 may store relationships of angular differences to corresponding axial positions or longitudinal positions of the shaft 28.

The shaft 28 comprises a core 30 and a metallic outer layer 26, which overlies a core 30 of the shaft 28. In one embodiment, the metallic outer layer 26 has a generally cylindrical outer surface 34. The thickness of the metallic outer layer 26 of the shaft (e.g., shaft 28) may be generally uniform along a length of the shaft 28. An induction hardening procedure or other case hardening procedure may be used to create a first hardness level of the metallic outer layer 26 of the shaft 28, for example. A laser augmentation procedure may be used to retard or advance cooling of the hardening procedure to produce one or more strips (e.g., 91, 93) with a second hardness level. The strips (e.g., 91, 93) may be formed of the same metallic material as the outer layer 26, but treated to a different hardness level. In FIG. 1, the first strip 91 comprises a generally linear segment, and the second strip 93 comprises a curved segment spaced apart from the linear segment.

Hardening refers to any process (e.g., induction hardening) which increases the hardness of a metal or alloy. For example, a metal or alloy is heated to a target temperature or target temperature range and cooled at a particular rate or over a particular cooling time. Case hardening refers to adding carbon to a surface of an iron alloy to produce a carburized alloy and heat-treating (e.g., induction heating) all or part of a surface of the carburized iron alloy. The hardening process may be used to change the permeability of the carburized iron alloy, metal or alloy, while leaving the electrical conductivity generally unchanged, for instance. The difference between the first hardness level and the second hardness level creates induced magnetic dipoles or magnetic fields associated with the first strip 91 and the second strip 93.

Induction hardening may be used to define the outer metallic layer 26 by controlling a depth of hardening through varying the induction current. In one example, the induction frequency may be varied linearly as the induction coil travels axially along the length of the shaft 28 to produce a non-linear depth of hardened case along the length of the shaft 28. In another example, the induction frequency may be varied to produce a linear variation of hardened case depth along the length of the shaft 28. The following variables may influence induction hardening of the shaft (e.g., shaft 28): (1) power density induced in a surface layer of the shaft 28, (2) clearance between the induction coil and the shaft 28, (3) concentricity or coaxial alignment between the induction coil and the shaft 28, (4) coil voltage, (5) coil design, (6) speed of coil travel with respect to the surface of the shaft 28, and (7) ambient conditions including room temperature, humidity and air turbulence.

Although the shaft 28 may be constructed of various metals or alloys that fall within the scope of the invention, in one embodiment the shaft 28 represents a steel or iron-based alloy, which may be plated with a protective metallic plating material (e.g., nickel and chromium). The protective metallic plating material is not shown in FIG. 1. If the metallic plating material is applied to an exterior surface of the shaft 28, the thickness of the plating should be kept substantially uniform to prevent disturbances in the eddy current or electromagnetic field induced by the sensor assembly 22.

FIG. 2 shows the shaft 28 at a second longitudinal position 40. In FIG. 2, the second angular difference ($\theta_2$ of FIG. 4) is aligned with the sensing region associated with the sensor assembly 22. The second angular difference ($\theta_2$) is associated with a second longitudinal position 40 of the shaft 28. The second longitudinal position 40 of the shaft 28 is spaced apart from the first longitudinal position 39. Like reference numbers in FIG. 2 and FIG. 1 indicate like elements.

Referring to FIG. 1 and FIG. 2, the sensor assembly 22 senses the induced magnetic field or one or more magnetic dipoles associated with the first strip 91 and the second strip 93 to detect an axial alignment of the shaft 28 with a reference point (e.g., a fixed point on the cylinder 12) at a particular time. For example, the sensor assembly 22 senses a first angular difference ($\theta_1$ of FIG. 3) between magnetic fields associated with the first strip 91 and the second strip 93 when the shaft 28 has a first longitudinal position 39; the sensor assembly 22 senses a second angular difference ($\theta_2$ of FIG. 4) between magnetic fields associated with the first strip 91 and the second strip 93 when the shaft 28 has a second longitudinal position 40. The change in the magnetic field between the first angular difference ($\theta_1$) and the second angular distance ($\theta_2$) indicates the movement or change in position of the shaft 28. The data processing module 55 measures the change in the angular magnetic field or electromagnetic field associated with the axial displacement of the shaft 28. The data processor 82 may store one or more of the following position reference data: a reference table, a look-up table, axial position data versus detected magnetic field, axial position data versus magnetic field patterns (e.g., magnetic field vectors of field strength and direction) a database of axial positions of the shaft 28 versus measured angular difference values, or an equation or curve representing axial positions of the shaft 28 versus measured angular difference values. The sensed angular difference is compared to the reference angular difference to determine the corresponding axial position of the shaft 28.

FIG. 3 shows a cross-sectional view of the shaft 28 along reference line 3-3 of FIG. 2. FIG. 3 illustrates the core 30 of the shaft 28 and the metallic outer layer 26. In the metallic outer layer 26 at a first longitudinal position 39, a first strip 91 is positioned at a first angle on the shaft, whereas a second strip 93 is positioned at a second angle on the shaft 28. The first angle and the second angle may be measured (e.g., in clockwise degrees) from a common reference angle, for example. The common reference angle may be established such that 0 degrees is generally upward or at 12 o'clock with respect to the cross-section of the shaft 28 in FIG. 3. The first angular difference ($\theta_1$) represents the angular displacement between the first angle and the second angle of FIG. 3. At the first angle of the first strip 91, a first magnetic field or first magnetic dipole is generally perpendicular or normal to an outer surface of the shaft 28. At the second angle of the second strip 93, a second magnetic field or second magnetic dipole is generally perpendicular or normal to an outer surface of the shaft 28. The sensor assembly 22 cooperates with the data processing module 55 to determine the axial position (e.g., first longitudinal position) of the shaft 28 associated with the first angular difference ($\theta_1$).

FIG. 4 shows a cross-sectional view of the shaft 28 along reference line 4-4 of FIG. 2. FIG. 4 illustrates the core 30 of the shaft 28 and the metallic outer layer 26. In the metallic outer layer 26, a first strip 91 is positioned at a first angle on the shaft 28, whereas a second strip 93 is positioned at a second angle on the shaft 28. The first angle and the second angle may be measured from a common reference angle. For example, the common reference angle may represent where 0 degrees and 360 degrees are generally upward in FIG. 4. The second angular difference ($\theta_2$) represents the angular displacement between the first angle and the second angle of the first strip 91 and the second strip 93, respectively, of FIG. 4. At the first angle of the first strip 91, a first magnetic field or first magnetic dipole is generally perpendicular or normal to an outer surface of the shaft 28. At the second angle of the second strip 93, a second magnetic field or second magnetic dipole is generally perpendicular or normal to an outer surface of the shaft 28. The sensor assembly 22 cooperates with the data processing module 55 to determine the axial position (e.g., second longitudinal position) of the shaft 28 associated with the second angular difference ($\theta_2$).

FIG. 5 shows a cross-sectional view of a sensor assembly 22 and an illustrative schematic of the data processing module 55 of FIG. 1. Further, the data processing module 55 and the sensor assembly 22 are associated with an energy source 90 (e.g., a battery or direct current supply). The sensor assembly 22 may comprises an array of sensors 88 embedded or retained by a generally annular retainer 23. For example, the sensors 88 may be aligned in a generally radial array about a common axis. In FIG. 5, the generally annular retainer 23 is cut-away to reveal the sensors 88, which are aligned radially about a central axis or opening of the sensor assembly 22. The data processing module 55 of FIG. 5 shows the illustrative data connections between the sensors 88 and the data interface 84, and between the data interface 84 and the data processor 82. Further, the data processing module 55 shows at least one rail of the direct current power bus for powering the sensors and the data processing module 55. Each sensor 88 may provide a state or level indicating the presence of a detected magnetic field at a certain angular orientation with respect to the shaft 28 at the data output port 86. Each sensor 88 may provide a "magnetic-field-detected" state and a "magnetic-field-not-detected" state, for example.

In an alternative embodiment, the sensor 88 may provide a signal or state representative of a magnetic field strength, orientation, or both at data output port 86 or otherwise.

Figure 6:
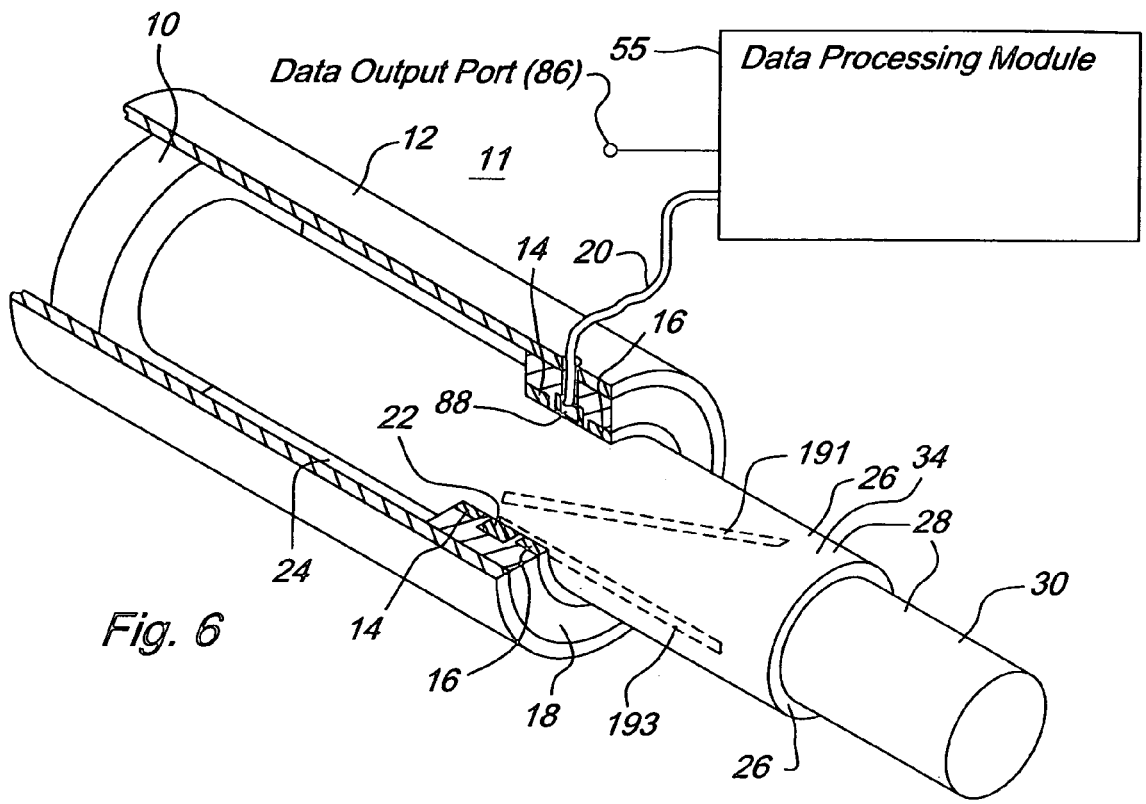
FIG. 6 is a perspective view of another embodiment of a system for detecting the longitudinal position of a shaft in accordance with the invention.

The configuration of FIG. 6 is similar to that of FIG. 1, except the first strip 191 of FIG. 6 is generally linear or rectangular and the second strip 193 of FIG. 6 is generally linear or rectangular. Like reference numbers indicate like elements in FIG. 1 and FIG. 6. The first strip 191 and the second strip 193 comprise generally linear segments, wherein the second strip 193 is generally parallel to a rotational axis of the shaft and wherein the first strip 191 is slanted with respect to the second strip 193.

Figure 7:
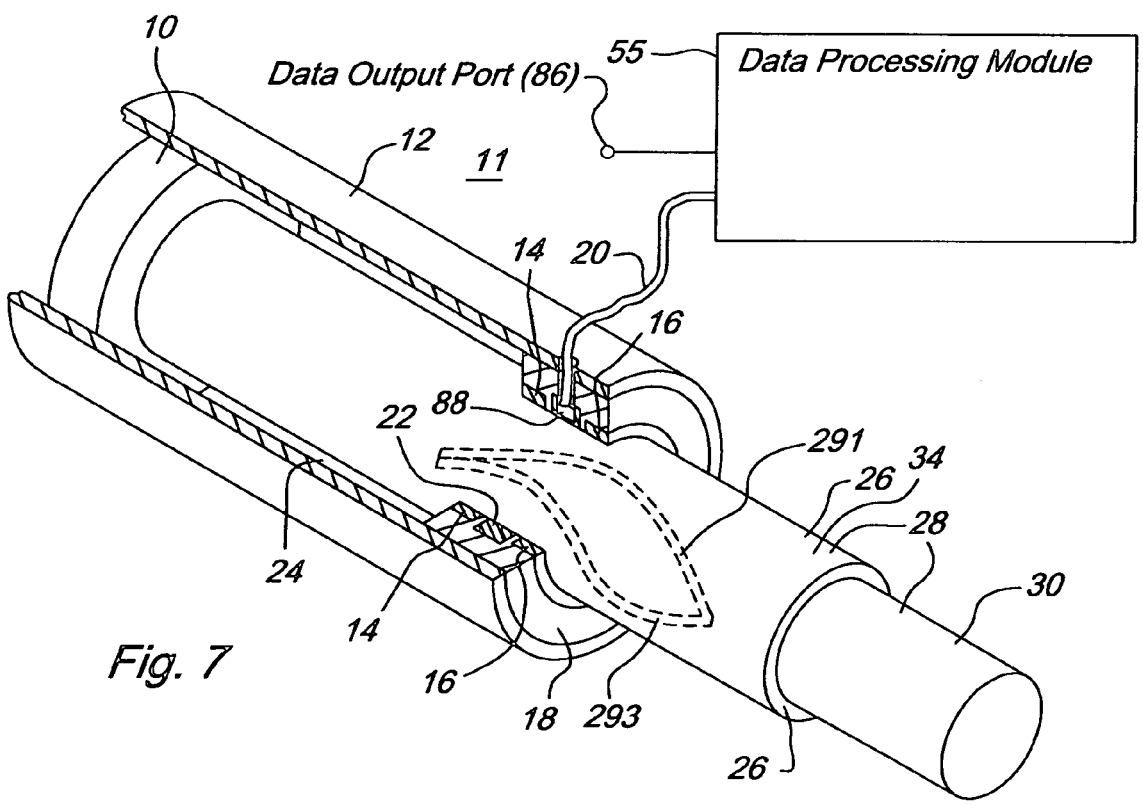
FIG. 7 is a perspective view of yet another embodiment of a system for detecting the longitudinal position of a shaft in accordance with the invention.

The configuration of FIG. 7 is similar to that of FIG. 1, except the first strip 291 of FIG. 7 comprises a first curve or waveform (e.g., a generally sinusoidal curve) with a first frequency and the second strip 293 comprises a second curve or waveform (e.g., a generally sinusoidal curve) with a second frequency, distinct from the first frequency. In general, the first step 291 and the second strip 293 comprise a first waveform (e.g., a first generally sinusoidal waveform) and a second waveform (e.g., second generally sinusoidal waveform) wherein the waveforms are offset in frequency with respect to one another and intersect or cross one another at one or more nodes. Here, as shown the first frequency and the second frequency are related by a multiple of two, although other multiples are possible and fall within the scope of the invention.

The first frequency and the second frequency may be selected with a corresponding wavelength to cover an axial region or distance of interest of the shaft 28 with a desired resolution. For example, the wavelength may be chosen such that the first strip 291 and the strip 293 only overlap or intersect at their ends. Here, the first strip 291 extends over approximately one wavelength, whereas the second strip 293 extends over approximately one-half wavelength. Therefore, the axial region of interest may equal approximately one wavelength for the first strip 291 and approximately one-half wavelength for the second strip 293.

In an alternative embodiment, the first frequency and the second frequency may be selected to have wavelengths that are smaller than the axial distance or region of interest such that the strips or curves overlap at one or more nodes. In such a case ambiguity would potentially exist because the angular differences would be equal at repetitive axial locations along the shaft 28 between different pairs of nodes. To the resolve this ambiguity, various techniques may be applied alternatively or cumulatively. Under a first technique, a third strip may be added or other supplemental magnetic markings added to the shaft that differ along its axial length with respect to different internodal locations. Under a second technique, a supplemental sensor may determine the direction of axial travel of the shaft 28 to resolve the ambiguity between each equivalent angular difference between magnetic regions associated with the shaft 28. Under a third technique, a supplemental sensor may be used when the shaft 28 reaches travel limit in one axial direction or when the shaft 28 reaches another travel limit in an opposite axial direction. For example, a contact sensor may be associated with the end of the bushing 18 to contact the member 10 (e.g., piston) at its travel limit and provide an electrical signal consistent with such contact.

Figure 8:
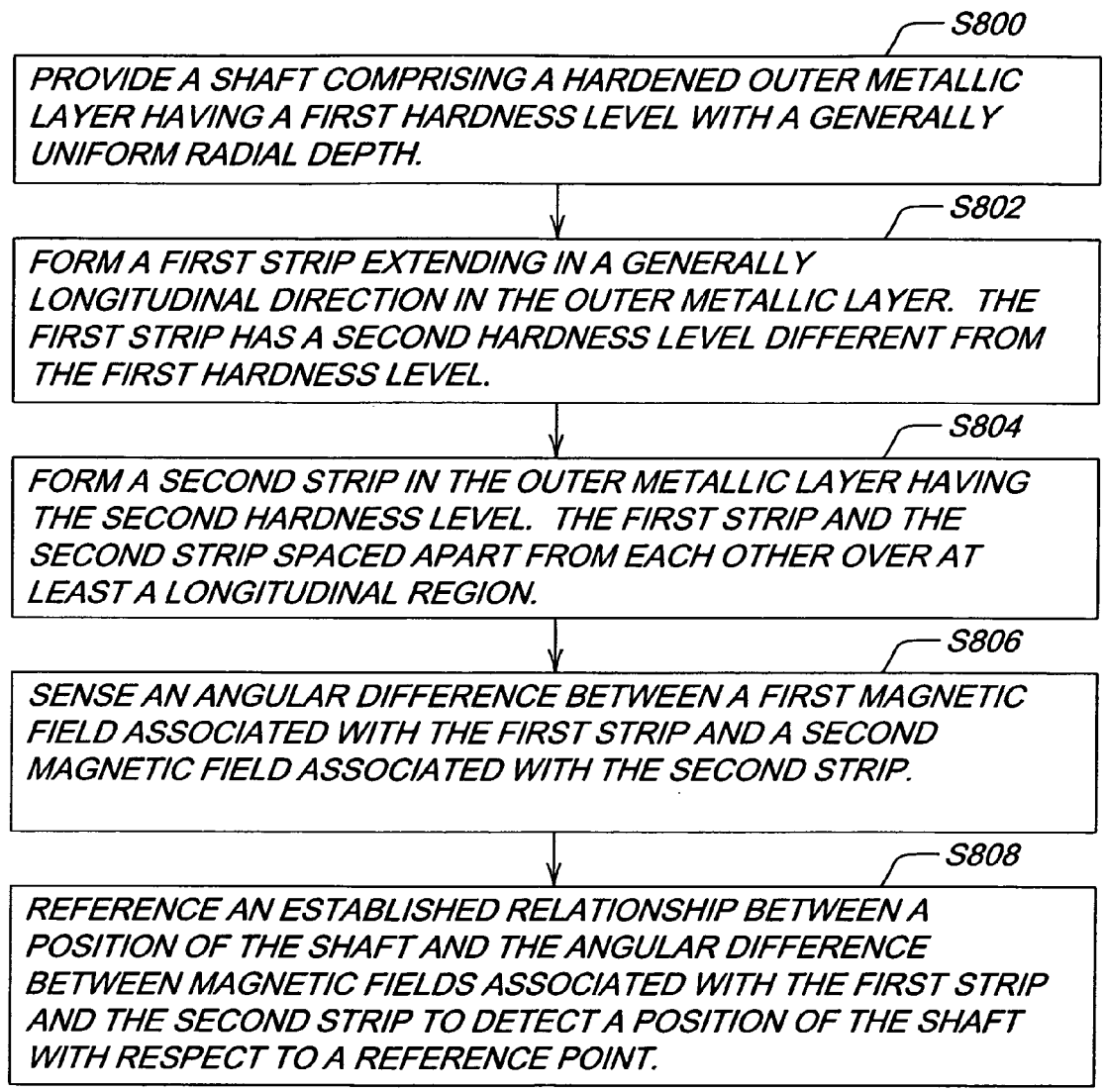
FIG. 8 is a flow chart of a method for detecting the axial position of a shaft.

FIG. 8 is flow chart of a method for detecting the axial position of a shaft. The method of FIG. 8 begins in step S800.

In step S800, a shaft (e.g., 28) is provided that comprises a hardened outer metallic layer (e.g., 26) having a first hardness level with a generally uniform radial depth. The shaft 28 may be induction hardened or otherwise treated to form the outer metallic layer 26 associated with the first hardness level.

In step S802, a first strip (e.g., 91, 191 or 291) is formed and extends in a generally longitudinal direction in the outer metallic layer (e.g., 26). Further, the first strip has a second hardness level different from the first hardness level. The first strip may be formed by treating the hardened metallic outer layer 26 with a laser beam to thermally augment or modify the induction hardening process. In one example, the laser beam can heat the shaft 28 in a localized area to delay cooling to form the first strip with a second hardness level less than the first hardness level. In another example, the laser beam can heat the shaft 28 in a localized area to a higher temperature than the remainder of the outer layer to form the first strip with a second hardness level greater than the first hardness level.

In step S804, a second strip (e.g., 93, 193, and 293) is formed and extends in the outer metallic layer (e.g., 26). Further, the second strip has the second hardness level and is spaced apart from the first strip. The second strip may be formed by treating the hardened metallic outer layer 26 with a laser beam to thermally augment or modify the induction hardening process. In one example, the laser beam can heat the shaft 28 in a localized area to delay cooling to form the second strip with a second hardness level less than the first hardness level. In another example, the laser beam can heat the shaft 28 in a localized area to a higher temperature than the remainder of the outer layer to form the second strip with a second hardness level greater than the first hardness level.

In step S806, a sensor assembly 22, a data processing module 55, or both sense an angular difference between a first magnetic field associated with the first strip (e.g., 91, 191, and 291) and a second magnetic field associated with the second strip (e.g., 93, 193 and 293). The angular difference between the magnetic field associated with the first strip and the second strip may differ in accordance with various configurations.

Under a first configuration of FIG. 1, the first strip 91 comprises a generally linear segment, and the second strip 93 comprises a curved segment spaced apart from the linear segment. Under a second configuration of FIG. 6, the first strip 191 and the second strip 193 comprise generally linear segments, wherein the second strip 193 is generally parallel to a rotational axis of the shaft and wherein the first strip 191 is slanted with respect to the second strip 193. Under a third configuration of FIG. 7, the first strip 291 and the second strip 293 comprise a first generally sinusoidal waveform and a second generally sinusoidal waveform, wherein the waveforms are offset in frequency with respect to one another and intersect or cross one another at one or more nodes.

In step S808, a sensor assembly 22, a data processing module 55, or both reference an established relationship between a position of the shaft and the angular difference between magnetic fields associated with the first strip (e.g., 91, 191 and 291) and the second strip (e.g., 93, 193 and 293) too detect a position of the shaft with respect to a reference point. The established relationships may be stored in a data storage device 80 of the data processing module 55 as a look-up table, a database or otherwise. In one example, the established relationship may comprise a stored list of angular differences and corresponding axial positions of the shaft 28. In another example, the established relationships may comprise a stored list of magnetic field patterns (e.g., magnetic field vectors) and corresponding axial positions of the shaft 28.

All of the foregoing embodiments of the system of method of detecting a position of a shaft (or member attached thereto), use sensors that are mounted external to the cylinder chamber. Accordingly, no special sealing of the cylinder chamber is required. The detection system and method operates by sensing electromagnetic fields induced on the shaft surface and within a penetration depth; does not need to contact the shaft and requires no moving parts that might detract from reliability. The system and method may be readily extended to determining torque or the number of revolutions associated with a shaft by sensing the magnetic field patterns associated with the spacing between the first strip and the second strip.

Having described the preferred embodiment(s), it will become apparent that various modifications can be made without departing from the scope of the invention as defined in the accompanying claims.

What is claimed is:

1. A method for detecting a position of a shaft, the method comprising:
    providing a shaft comprising a hardened outer metallic layer having a first hardness level with a generally uniform radial depth;
    forming a first strip extending in a generally longitudinal direction in the hardened outer metallic layer, the first strip having a second hardness level different from the first hardness level;
    forming a second strip in the hardened outer metallic layer having the second hardness level, the first strip and the second strip spaced apart from each other over a longitudinal region;
    sensing an angular difference between a first magnetic field associated with the first strip and a second magnetic field associated with the second strip; and
    referencing an established relationship between a position of the shaft and the angular difference between the magnetic fields associated with the first strip and the second strip to detect a position of the shaft with respect to a reference point.

2. The method according to claim 1 wherein the first hardness level is greater than the second hardness level.

3. The method according to claim 1 wherein the first hardness level is less than the second hardness level.

4. The method according to claim 1 wherein the first strip comprises a curved segment, and wherein the second strip comprises a generally linear segment spaced apart from the curved segment.

5. The method according to claim 1 wherein the first strip and the second strip comprise generally linear segments, wherein the second strip is generally parallel to a rotational axis of the shaft and wherein the first strip is slanted with respect to the second strip.

6. The method according to claim 1 wherein the first strip and the second strip comprise a first generally sinusoidal wave and a second generally sinusoidal wave, wherein the wave are offset in frequency with respect to one another and cross one another at one or more nodes.

7. The method according to claim 1 further comprising storing the established relationship as angular differences and corresponding axial positions of the shaft.

8. The method according to claim 1 further comprising storing the established relationship as magnetic field patterns and corresponding axial positions of the shaft.

9. A system for detecting a position of a shaft, the system comprising:
    a shaft comprising a hardened outer metallic layer having a first hardness level with a generally uniform radial depth;

a first strip extending in a generally longitudinal direction in the hardened outer metallic layer, the first strip having a second hardness level different from the first hardness level;

a second strip in the hardened outer metallic layer having the second hardness level, the first strip and the second strip spaced apart from each other over a longitudinal region;

a sensor assembly for sensing an angular difference between a first magnetic field associated with the first strip and a second magnetic field associated with the second strip; and a data processor for referencing an established relationship between a position of the shaft and the angular difference between the magnetic fields associated with the first strip and the second strip to detect a position of the shaft with respect to a reference point.

10. The system according to claim 9 wherein the first hardness level is greater than the second hardness level.

11. The system according to claim 9 wherein the first hardness level is less than the second hardness level.

12. The system according to claim 9 wherein the first strip comprises a curved segment, and wherein the second strip comprises a generally linear segment spaced apart from the curved segment.

13. The system according to claim 9 wherein the first strip and the second strip comprise generally linear segments, wherein the second strip is generally parallel to a rotational axis of the shaft and wherein the first strip is slanted with respect to the second strip.

14. The system according to claim 9 wherein the first strip and the second strip comprise a first generally sinusoidal wave and a second generally sinusoidal save, wherein the wave are offset in frequency with respect to one another and cross one another at one or more nodes.

15. The system according to claim 9 wherein the sensor assembly comprises a group of magnetoresistive sensors radially aligned with respect to the shaft.

16. The system according to claim 9 further comprising a data storage device for storing the established relationship as angular differences and corresponding axial positions of the shaft.

17. The system according to claim 9 further comprising a data storage device for storing the established relationship as magnetic field patterns and corresponding axial positions of the shaft.

\* \* \* \* \*